Jan. 25, 1949.　　　D. C. GOODCHILD　　　2,460,081
EPICYCLIC CHANGE SPEED GEAR
Filed Sept. 3, 1943　　　　　　　　　　　　4 Sheets-Sheet 1
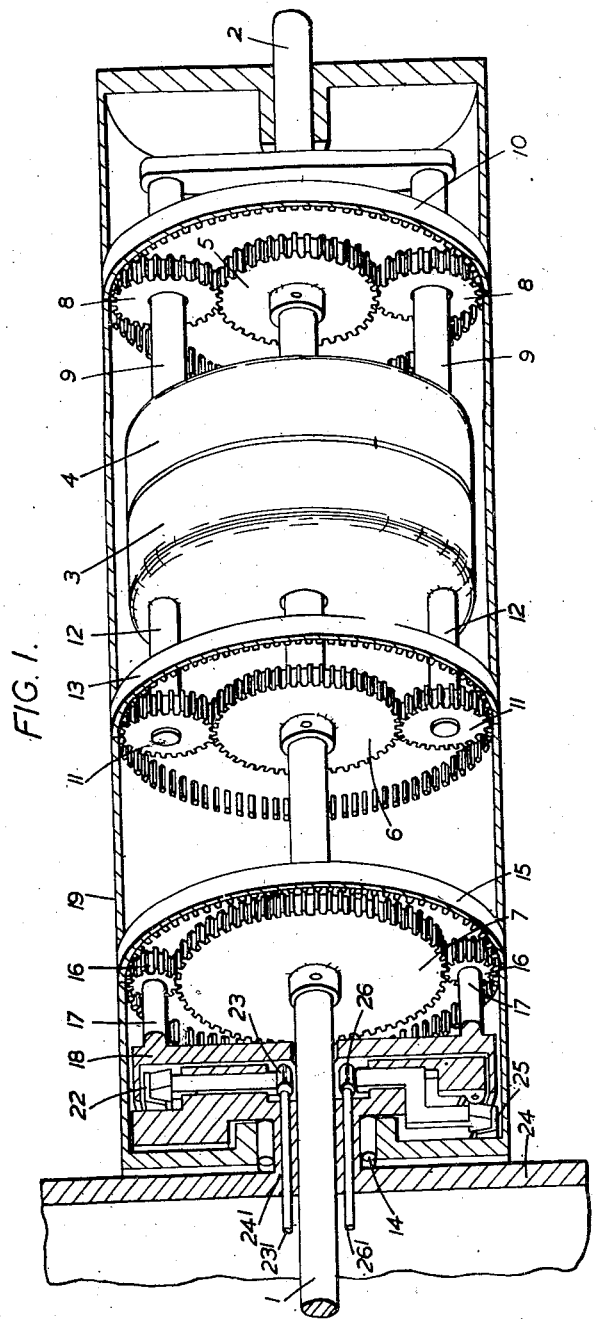
Inventor
By David C. Goodchild
John E. Easelick
Attorney

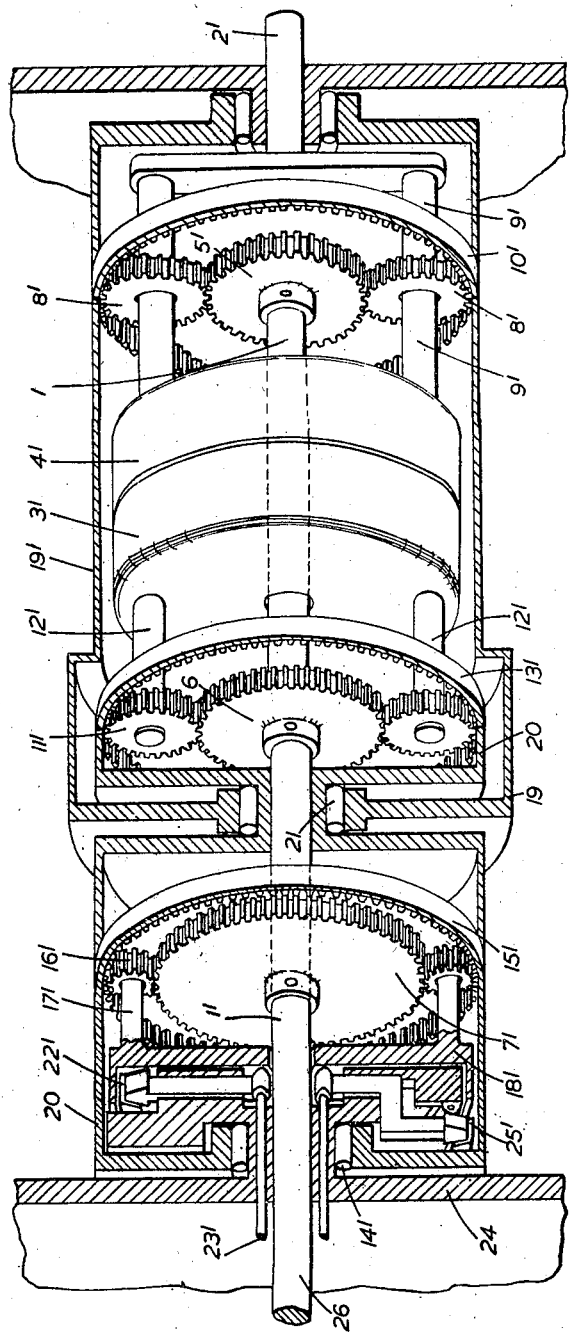

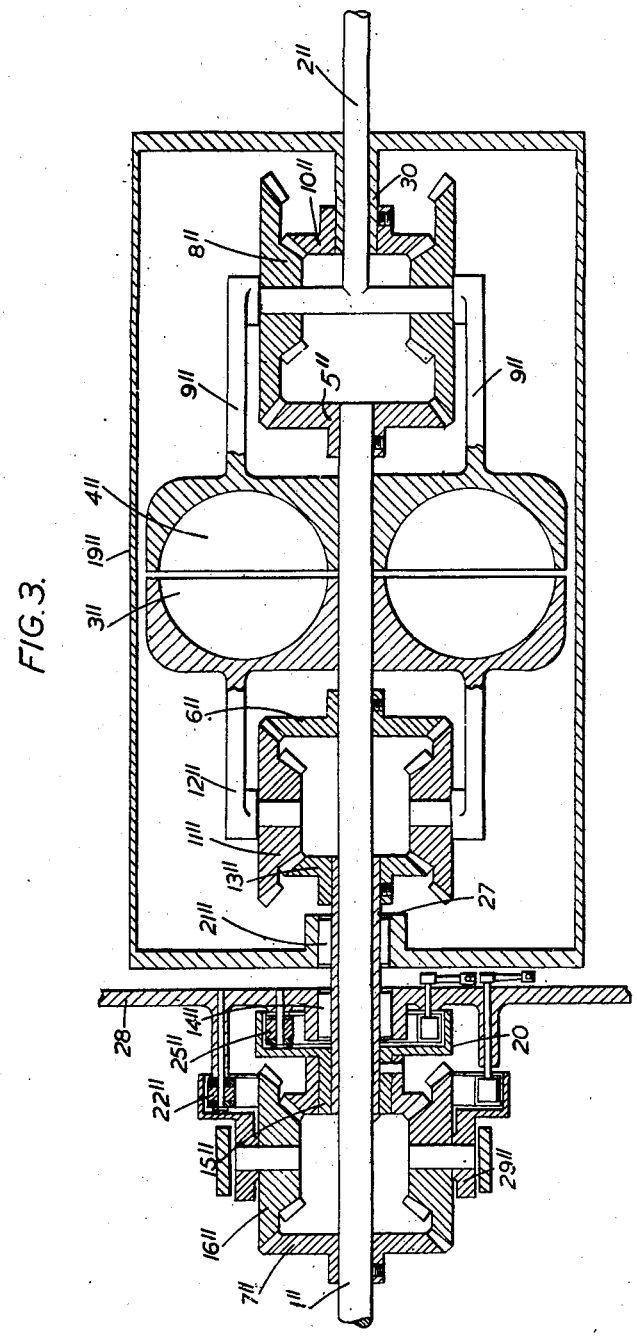

Jan. 25, 1949. D. C. GOODCHILD 2,460,081
EPICYCLIC CHANGE SPEED GEAR
Filed Sept. 3, 1943 4 Sheets-Sheet 4
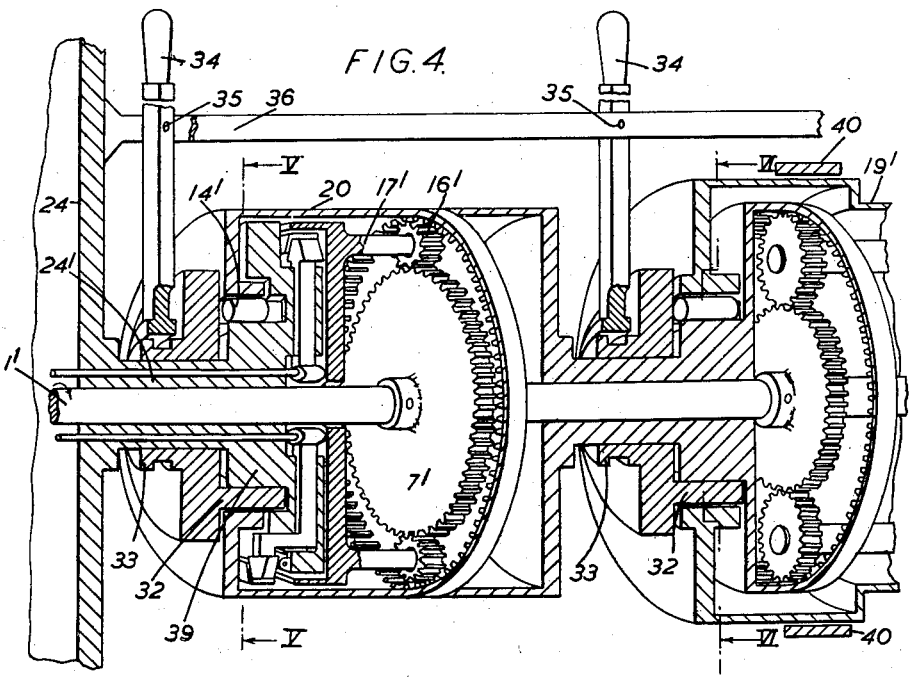
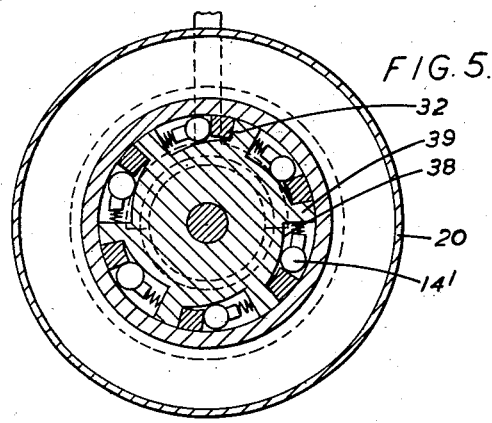
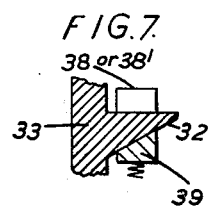
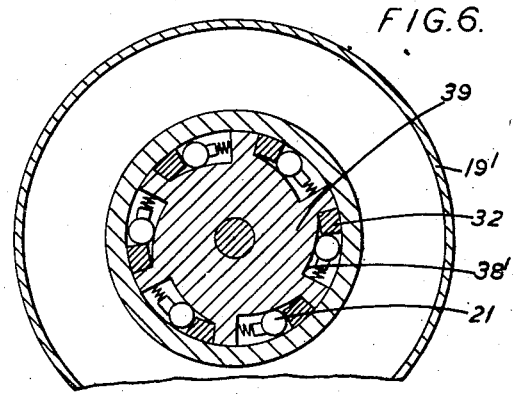
Inventor
David C. Goodchild
By
John E. Eastlack
Attorney Patented Jan. 25, 1949

2,460,081

UNITED STATES PATENT OFFICE 2,460,081

EPICYCLIC CHANGE-SPEED GEAR

David Cecil Goodchild, London, England

Application September 3, 1943, Serial No. 501,167
In Great Britain September 3, 1942

16 Claims. (Cl. 74—688)

This invention relates to epicyclic change speed gearing, of the kind in which such gearing is combined with a fluid coupling of the fluid flywheel type.

In the gearing of this kind heretofore suggested, the fluid coupling has been arranged between the engine or other driving means and the epicyclic gearing as a whole.

According to the present invention, in order to provide an infinitely variable gear ratio dependent upon load, the fluid coupling is arranged between two sets of epicyclic gearing, one member of the fluid coupling being connected to the shafts of the orbital wheels (otherwise known as planet wheels) of one set of epicyclic gearing, the shafts of these orbital wheels being positively connected to the driven shaft, and the other member of the fluid coupling being positively connected to the shafts of the orbital wheels of the other set of epicyclic gearing. The sun wheels of both sets of epicyclic gearing are fixed on the driving shaft and the toothed annuli or equivalent gear wheels with which the orbital wheels of the two sets of epicyclic gearing (hereinafter termed series of annulus unit teeth) engage are positively connected together to form a common annulus unit. The sun wheel of the set of epicyclic gearing on the driven side of the fluid coupling is of slightly different diameter from the sun wheel of the set of epicyclic gearing on the driving side of the fluid coupling, the diameters of the respective toothed annuli or equivalent gear wheels being assumed to be equal. Means are also provided for controlling the rotation of the common annulus unit in one or both directions. As a result of this arrangement, when the driven shaft is stationary the driving member of the fluid coupling is caused to rotate at a slower speed than the driving shaft but in the same direction and with increased torque.

In an alternative arrangement a ball or roller freewheel device is provided between the two series of annulus unit teeth, in order that one section of this common annulus unit may be allowed independent and unidirectional rotation.

Owing to the inherent property of the fluid coupling to transmit full torque, the effect of increased torque in the driving member of the coupling is passed to the driven member and to the driven shaft. Furthermore, owing to the centrifugal action of the fluid medium, the percentage slip tends to decrease as the speed of the driving shaft is increased. In fact, however, the percentage slip decreases only as the load on the driven shaft decreases or as the applied load is overcome. This reduction in percentage slip has the effect of reducing the gear ratio between the driving shaft and driving member of the coupling, hence between the driving shaft and the driven shaft. It should be noted that the driving member of the coupling is always rotating at a greater speed than the driven member, by virtue of their mechanical linkage, which difference in speed gradually becomes less proportionately with the reduction in percentage slip until, ultimately, direct drive is obtained. In point of fact a slight overdrive obtains when the load is negative, but the extent of this is restricted by the fluid coupling which then acts in the reverse direction and again tends to enforce direct drive, hence the braking effect of the engine is maintained to a large degree. Preferably, it should be arranged, for a given driving member speed, that the difference in speed between the driving member and the driven member fixed by their mechanical linkage should exceed the difference that would exist at the same speed due to slip in the coupling under conditions of maximum load. This creates the tendency towards direct drive.

A reverse drive is obtained by providing on the common annulus unit an additional series of annulus unit teeth with which there engage orbital wheels, that have their shafts fixed, e. g. to a brake drum, and that also engage a sun wheel fixed on the driving shaft. When the brake drum is held fast, a constant gear ratio in the reverse direction is provided preferably affording a low speed of the driven member, for which purpose the sun wheel on the driving shaft is made of comparatively large diameter.

The sets of epicyclic gearing are preferably of the type in which the sun wheel, the orbital wheels and an internally toothed annulus are arranged substantially in one plane. Other forms of epicyclic gearing may be employed, e. g. those of the "differential gear" type wherein bevel wheels are employed, in which case the two series of teeth on the common annulus unit (series of annulus unit teeth) consists of two bevel wheels, the orbital wheels being mounted on radially arranged shafts positively connected to the respective members of the fluid coupling. Here the different velocity ratios of the two sets of epicyclic gearing are obtained by making each orbital wheel of two toothed members of different diameters, which are fixed together and mesh respectively with a bevel sun wheel on the driving shaft and with a bevel sun wheel positively connected to the common annulus unit, and corresponding to the internally toothed annulus in the form of my improved gearing first mentioned.

In the accompanying drawing, Figures 1, 2 and 3 are diagrammatic illustrations of three constructional forms, which are given by way of example, of the epicyclic gearing forming the subject of the present invention. Figure 4 is a similar view corresponding to Figure 2 showing a modification.

Figures 5 and 6 are sections on the lines V—V and VI—VI, Figure 4.

Figure 7 is a tangential section of one of the free wheel clutches shown in Figure 4.

In Figure 1, 1 is the driving shaft and 2 the driven shaft; 3, 4 are the corresponding members of the fluid coupling. On the driving shaft 1 are fixed sun wheels 5, 6, 7. The sun wheel 5 coacts with orbital wheels 8, 8, which have their shafts 9 fixed to the driven shaft 2 and to the member 4 of the fluid coupling and which also coact with an internally toothed annulus 10 (series of annulus unit teeth) forming part of the annulus unit. The sun-wheel 6 coacts with orbital wheels 11, 11, the shafts 12 of which are fixed to the member 3 of the fluid coupling and which coact with an internally toothed annulus (series of annulus unit teeth) 13 also forming part of the annulus unit.

A free-wheel device is provided on the annulus unit 10, 13 for preventing rotation thereof in the anti-crankwise direction, e. g. a jamming ball or roller bearing as used on automobiles, shown diagrammatically at 14.

Reverse drive is obtained by providing on the annulus unit an additional internally toothed annulus (series of annulus unit teeth) 15 coacting with orbital wheels 16, 16 and also meshing with the sun-wheel 7, the shafts 17 of said orbital wheels being fixed to a drum 18 which when reverse drive is required is held against rotation, e. g. by applying thereto a brake 22 consisting of two semi-circular shoes hinged together at one of their ends to a pivot on the frame member 24 through the bearing 24' and adapted to be forced apart at their free ends by means of a radially slidable rod acted upon by a cam 23 on a rotatable rod 23' in order to apply the brake.

The rotation of the annulus 19 can be arrested by a brake 25 also consisting of two semicircular shoes hinged to a pivot on the frame member 24 through the bearing 24' and adapted to be similarly forced apart by a cam 26 on a rotatable rod 26'.

Explaining the operation more in detail, when the gear is starting in operation, the driven shaft 2 being stationary, the driving member 3 of the fluid coupling will rotate at a slower speed than the driving shaft 1, the ratio between the speed of the driving member 3 of the coupling and that of the driving shaft 1 being then dependent on the relative diameters of the corresponding sun wheel 6 and the toothed annulus 13 and on the relative diameters of the driving wheel 5 and annulus 10. During such starting operation and during forward drive the common annulus unit 10, 13 is restrained by means of the free wheel gear 14 from rotation in the opposite direction (hereinafter referred to as anti-crankwise) to that of the driving shaft (hereinafter referred to as crankwise), whereby the lowest ratio (slowest speed of the driving member of the fluid coupling for a given speed of engine) of the infinitely graded series of speeds for forward drive is set at any desired value. Forward drive at this ratio will then take place and the speed of the driven shaft 2 will increase gradually until a substantially direct drive is obtained, this speed being dependent on the load and the power of the engine. If however, the movement of the common annulus unit be restrained in both directions, e. g. by applying a brake thereto, the lowest gear will be brought into operation as a constant ratio, e. g. for descending steep hills or as an emergency low gear. It may also be used to retard the annulus prior to the change from neutral to forward drive.

When the system is running at the normal speed the common annulus unit may be allowed to rotate unrestricted, which rotation will be in a crankwise direction.

If however the movement of the common annulus unit be unrestricted when the gear is started in operation, the driven shaft being stationary, the extremely low speed of the driving member of the fluid coupling relatively to the driving shaft will permit a substantially 100% slip between the two members of the fluid coupling so as to give a "neutral" state of the gear. In this arrangement a further fluid coupling may be arranged between the engine and the driving shaft 1 in order to provide greater smoothness when starting from rest and stopping, and a more definite "neutral" state.

In the gearing shown in Figure 2, the toothed annulus 10', whose orbital wheels 8' have their shafts 9' fixed to the driven shaft 2', forms part of a separate annulus unit 19' to the annulus unit 20, which includes the annuli 13' and 15' (each forming a series of annulus unit teeth), the units 19' and 20 being connected together through a free wheel device 21, which prevents crankwise rotation of the annulus 19' relatively to the annulus 20. In this arrangement also the reverse drive is set in operation by means of a brake 22' applied to the disc 18' bearing the shafts 17' of the orbital wheels 16' in a similar manner to that described with reference to Figure 1. The rotation of the annulus 20 can be arrested in order to obtain low gear by means of a brake 25' also in a similar manner to that described with reference to Figure 1. The other members of the gearing bear corresponding reference numerals to those in Figure 1.

By this arrangement, it is ensured that the crankwise rotation of the annulus 10' associated with the driven member 4' of the fluid coupling shall be imparted to the ratio-controlling annulus unit 13' but the annulus 10' is free to rotate independently in an anti-crankwise direction thus providing a true neutral. In starting from rest the initial driving torque is transmitted through the fluid coupling, the annulus 19' being free to rotate in an anti-crankwise direction. The annulus 20 then remains stationary. As the speed of the driven shaft 2' increases the annulus 19' slows down and then rotates crankwise carrying with it the annulus unit 20. As the speed increases the fluid coupling picks up and the driven shaft is accelerated until the desired speed is reached. By this means, flexibility and smoothness in operation are obtained. Means can also be provided for releasing the free-wheel device 14' to give neutral. For this purpose, as shown in Figures 4 and 5, tongues 32 are provided on a sleeve 33 that is axially movable on the exterior surface of the bearing member 24' by means of a lever 34 pivoted at 35 to a frame member 36. These tongues 32, when the sleeve 33 is moved towards the free-wheel device, press the rollers 14' into the deeper parts of inclined recesses 38 in the periphery of a disc 39 mounted on the bearing member 24', and thus prevent the rollers 14' from becoming jammed in the shallower parts of said recesses. The free wheel device thus leaves the annulus 20 free to rotate in both directions relatively to the frame 24 as determined by the interaction of the several parts of the epicyclic gearing. The annulus 10', 19' can be similarly rendered free to rotate in both directions relatively to the annulus 20 by controlling the movement of the rollers 21 of the corresponding free wheel device as shown in Figures 5 and 6, the inclines in the bases of the recesses 38' (Figure 6) being arranged in the opposite direction to those in the recesses 38 (Figure 5).

Moreover, the driven shaft may be stopped with the driving shaft rotating at the idling speed, without stalling the engine, the slip in the coupling being 100%. Means such as the brake band 40 may also be provided for braking the annulus 10'.

In the arrangement shown in Figure 3, the epicyclic trains are of the "differential gear" or bevel wheel type. Thus the driving shaft 1" bears bevel sun wheels 5", 6" and 7" meshing with the outer members of double orbital bevel wheels 8", 11" and 16", the inner members of which mesh with bevel wheels 10", 13" and 15" (each forming a series of annulus unit teeth) forming part of what is herein termed the "annulus unit" 19". The annulus unit 19" is rotatable at one end on the driven shaft 2" and at the other end on a hollow shaft 27 bearing the bevel wheels 13" and 15", a free-wheel device 21" being arranged between the shaft 27 and the annulus unit 19". The rotation of the hollow shaft 27 itself is controlled by a free wheel device 14" mounted on a fixed frame member 28. The orbital wheels 16" meshing with the sun wheel 7" are advantageously mounted on a drum 29" the rotation of which can be controlled or arrested by means of a brake. Here the different velocity ratios of the two sets of epicyclic gearing are obtained by making corresponding orbital wheels of the two sets of epicyclic gearing of different diameters.

The velocity ratio of the members of the orbital wheels 8" meshing with the driving shaft sun wheel 5" relatively to such sun wheel is different from the velocity ratio of the other members of the orbital wheels 8" relatively to the sun wheel 10" which is connected to the annulus unit 19". On the driving side of the fluid coupling the members of the orbital wheels 11" meshing with the driving shaft sun wheel 6" have a different velocity ratio relatively to such sun wheel from the velocity ratio of the other members of the orbital wheels 11" relatively to the sun wheel 13" connected to the annulus unit 19". In this arrangement the sun wheels 5" and 6" fixed to the driving shaft 1" are advantageously arranged next to the corresponding member of the fluid coupling, the sun wheels 10", 13" corresponding to the toothed annuli being fixed to hollow shafts 27, 30 rotatable on the driving and driven shafts respectively and connected to the part of the common annulus unit exterior to the fluid coupling.

If desired the free wheel device 21" may be dispensed with and the annulus unit 19" fixed to the hollow shaft 27 so as to produce a corresponding arrangement to that shown in Figure 1.

My improved gearing occupies less space, and weighs less than the separate fluid flywheel and epicyclic box heretofore employed, owing to the use of three epicyclic trains as against the usual four and to the greater compactness. Moreover the improved gearing is more silent in operation, due to the relatively slow speeds of the orbital wheels and to the absence of several trains of idle gearing. There are two brakes only as against the four or five in the epicyclic gear box heretofore used and these are operated very occasionally, viz:

(a) When setting the gear for reverse drive.

(b) When retarding the annulus prior to the change from neutral to forward drive.

(c) When obtaining emergency low gear.

In order to render the claims free from ambiguity, the toothed wheels fixed to and concentric with one power-transmission shaft are termed "sun wheels"; those meshing therewith and having their axes either parallel or radial relatively to the said power-transmission shaft are termed "orbital wheels" (otherwise known as "planet wheels"); and the annular series of teeth, which are concentric with the "sun wheels" and which are connected together to form an "annulus unit," whether such annular series of teeth is formed as an internal gear wheel or is formed as a bevel wheel on a conical surface, are termed "annulus unit teeth."

What I claim is:

1. Epicyclic gearing including a fluid coupling, a driving shaft and a driven shaft, wherein the shafts of the orbital wheels of one set of epicyclic gearing comprising a sun wheel, orbital wheels and a series of annulus unit teeth are connected to the driven shaft and to one member of the fluid coupling, and wherein the shafts of the orbital wheels of another set of epicyclic gearing also comprising a sun wheel, orbital wheels and a series of annulus unit teeth, are connected to the other member of the fluid coupling, the sun wheels of both sets of epicyclic gearing being fixed to the driving shaft, and the series of annulus unit teeth of the two sets of epicyclic gearing being connected together to form an annulus unit, and means for controlling the rotation of the annulus unit.

2. Epicyclic gearing as claimed in claim 1, wherein the sun wheel of the set of epicyclic gearing on the driven side of the fluid coupling is made of slightly different diameter, e. g. smaller, from the sun wheel of the set of epicyclic gearing on the driving side of the fluid coupling, the diameters of the respective series of annulus unit teeth being assumed equal.

3. Epicyclic gearing as claimed in claim 1, wherein the series of annulus unit teeth of the two sets of epicyclic gearing are connected together through a one-way driving clutch or free wheel device.

4. Epicyclic gearing as claimed in claim 1 including an additional sun wheel fixed to the driving shaft, additional orbital wheels engaging said additional sun wheel and having shafts, an additional series of annulus unit teeth engaging said additional orbital wheels and connected to one of the first named series of annulus unit teeth associated with the driving member of the fluid coupling, and a member capable of being held against rotation fixed to the shafts of said additional orbital wheels.

5. Epicyclic gearing as claimed in claim 1, including a free-wheel device connecting together the two series of annulus unit teeth, an additional series of annulus unit teeth connected to the series of annulus unit teeth associated with the driving member of the fluid coupling, additional orbital wheels engaging said additional series of annulus unit teeth and having shafts, an additional sun wheel fixed to the driving shaft and engaging said additional orbital wheels, and a member capable of being held against rotation fixed to the shafts of said additional orbital wheels.

6. Epicyclic gearing comprising a driving power-transmission shaft, a driven power transmission shaft, two sets of epicyclic gearing each including a sunwheel, a plurality of orbital wheels meshing with said sun-wheel and a series of annulus unit teeth meshing with each set of orbital wheels, and a fluid coupling, the sun-wheels of the said sets of epicyclic gearing being fixed to the driving power-transmission shaft, the sets of orbital wheels being connected respectively by means of their shafts to opposite members of the fluid coupling, the series of annulus unit teeth of the two sets of epicyclic gearing being connected together, and the driven power-transmission shaft being connected to the driven member of the fluid coupling.

7. Epicyclic gearing comprising a first power transmission shaft, a second power transmission shaft, two sets of epicyclic gearing each including a driving wheel, a plurality of planet wheels meshing with said driving wheel and a driven wheel meshing with each set of planet wheels, and a fluid coupling, the driving wheels of the said sets of epicyclic gearing being fixed to the first power transmission shaft, the sets of planet wheels being connected respectively by means of their shafts to opposite members of the fluid coupling, the driven wheels of the sets of epicyclic gearing being connected together, and the other or second power transmission shaft being connected to the driven member of the fluid coupling.

8. Epicyclic gearing as claimed in claim 7, including an additional driving wheel fixed to the first power transmission shaft, additional planet wheels engaging said additional driving wheel and having shafts, an additional driven wheel engaging said additional planet wheels and connected to the driven wheel of one of the other sets of epicyclic gearing, and a member capable of being held against rotation fixed to the shafts of said additional planet wheels.

9. Epicyclic gearing as claimed in claim 7, wherein the driven wheels meshing with each set of planet wheels are connected together through a one-way driving clutch or free-wheel device.

10. Epicyclic gearing comprising a first power-transmission shaft, a second power-transmission shaft, two sets of epicyclic gearing each including a driving wheel, a plurality of planet wheels meshing with said driving wheel and a driven wheel meshing with said planet wheels, a fluid coupling, the driving wheels of the said sets of epicyclic gearing being fixed to the first power-transmission shaft, the sets of planet wheels being connected respectively by means of their shafts to opposite members of the fluid coupling, a one-way driving clutch connecting the driven wheels of the sets of epicyclic gearing, means connecting the second power-transmission shaft to the driven member of the fluid coupling, an additional driving wheel fixed to the first power-transmission shaft, additional planet wheels engaging said additional driving wheel, and having shafts, an additional driven wheel engaging said additional planet wheels and connected to the driven wheel of one of the other sets of epicyclic gearing, and a member capable of being held against rotation fixed to the shafts of said additional planet wheels.

11. Epicyclic change speed gearing comprising a power-transmission shaft, a second power-transmission shaft, two sets of epicyclic gearing each including a sun wheel, a plurality of orbital wheels meshing with said sun wheel, a series of annulus unit teeth meshing with said orbital wheels, and a fluid coupling, characterized in that the sun wheels of the said sets of epicyclic gearing are fixed to one of said power-transmission shafts, the sets of orbital wheels are connected by their shafts respectively to opposite members of the fluid coupling, and one of the members of the fluid coupling is connected to the other of said power-transmission shafts.

12. Epicyclic gearing as claimed in claim 11, characterised in that the sun wheels and orbital wheels are made in the form of bevel wheels, and the series of annulus unit teeth with which the orbital wheels mesh and which are concentric with the driving and driven shafts, are also made in the form of bevel wheels which are connected together to form an annulus unit, the orbital wheels having their shafts arranged radially and each orbital wheel being composed to two toothed members of different diameters, which are fixed together and mesh respectively with the bevel sun wheel on the driving shaft and with one of the two bevel wheels associated with the common annulus unit.

13. Epicyclic gearing as claimed in claim 11, characterised in that the sun wheels and orbital wheels are made in the form of bevel wheels, and the series of annulus unit teeth with which the orbital wheels mesh are also made in the form of bevel wheels, which are concentric with the driving and driven shafts, and which are connected together to form an annulus unit, the orbital wheels having their shafts arranged radially, each orbital wheel being composed of two toothed members of different diameters which are fixed together, and mesh respectively with a bevel sun wheel on the driving shaft and with one of the two bevel wheels that form the common annulus unit, an additional bevel wheel concentric with the driving shaft and connected with said annulus unit, an additional set of orbital wheels having radially arranged shafts, a brake drum mounting said last-named shafts, each of the orbital wheels of said additional set comprising two toothed members of different diameters fixed together, an additional bevel sun wheel fixed to the driving shaft and meshing with one of the two last-named toothed members, the other of the two last-named toothed members meshing with the bevel wheel connected with said annulus unit.

14. Epicyclic gearing as claimed in claim 11, characterised in that the wheels concentric with the driving and driven shafts and the orbital wheels are made in the form of bevel wheels, and the series of annulus unit teeth with which the orbital wheels mesh are also made in the form of bevel wheels which are connected together to form an annulus unit, the orbital wheels having their shafts arranged radially, each orbital wheel being composed of two toothed members of different diameters which are fixed together and mesh respectively with a bevel sun wheel on the driving shaft and with one of the two bevel wheels that form part of the common annulus unit, and a free wheel device arranged between the bevel wheel in said annulus associated with the driving member of the fluid coupling and the bevel wheel in said annulus associated with the driven member of the fluid coupling, an additional bevel wheel concentric with the driving shaft and connected with said annulus unit, an additional set of orbital wheels having radially arranged shafts, a brake drum mounting said last named shafts, each orbital wheel of said additional set comprising two toothed members fixed together, an additional bevel sun wheel fixed on the driving shaft and meshing with one of said two last named toothed members, the other of said two last named toothed members meshing with said additional bevel wheel connected with said annulus unit.

15. Epicyclic gearing comprising two sets of epicyclic gearing having a fluid coupling between them, two interconnected bevel wheels concentric with the driving and driven shafts and forming an annulus unit, two sets of bevel orbital wheels having their shafts arranged radially, each orbital wheel being composed of two toothed members of different diameters fixed together, bevel sun wheels fixed to the driving shaft and meshing with one of the two toothed members of each orbital wheel, the other toothed member of each orbital wheel meshing with one of the bevel wheels forming the annulus unit, one set of said orbital wheels having their shaft positively connected to the driven member of the fluid coupling, the other set of orbital wheels having their shafts positively connected to the driving member of the fluid coupling, wherein the velocity ratio of the driving shaft sun wheel to the meshing orbital wheels having their shaft connected to the driven member of the fluid coupling is different from the velocity ratio of the same orbital wheels to the bevel wheel meshing therewith and forming a part of the annulus unit, and wherein the velocity ratio of the driving shaft sun wheel to the meshing orbital wheels having their shafts connected to the driving member of the fluid coupling is different from the velocity ratio of the same orbital wheels to the bevel wheel meshing therewith and forming a part of the annulus unit.

16. Epicyclic gearing comprising two sets of epicyclic gearing having a fluid coupling between them, two interconnected bevel wheels concentric with the driving and driven shafts and forming an annulus unit, two sets of bevel orbital wheels having their shafts arranged radially, each orbital wheel being composed of two toothed members of different diameters fixed together, bevel sun wheels fixed to the driving shaft and meshing with one of the two toothed members of each orbital wheel, the other toothed member of each orbital wheel meshing with one of the bevel wheels forming the annulus unit, one set of said orbital wheels having their shafts positively connected to the driven member of the fluid coupling, the other set of orbital wheels having their shafts positively connected to the driving member of the fluid coupling, and a free wheel device arranged between the bevel wheel forming a part of the annulus unit and operatively connected with the driving member of the fluid coupling and the bevel wheel forming a part of the annulus unit and operatively connected with the driven member of the fluid coupling.

DAVID CECIL GOODCHILD.

REFERENCES CITED

The following references are of record in the file of this patent:

UNITED STATES PATENTS

| Number | Name | Date |
|---|---|---|
| 1,242,974 | Pinckney | Oct. 16, 1917 |
| 2,021,526 | Stock | Nov. 19, 1935 |
| 2,147,528 | Fottinger | Feb. 14, 1939 |
| 2,235,370 | Jandasek | Mar. 18, 1941 |
| 2,301,451 | Pollard | Nov. 10, 1942 |